United States Patent

Vredenburgh et al.

[15] 3,674,723
[45] July 4, 1972

[54] ALKYLPHENOL-ALDEHYDE RESINS

[72] Inventors: Walter A. Vredenburgh; Samuel D. Hollis, both of Pleasant Hills, Pa.

[73] Assignee: Pennsylvania Industrial Chemical Corporation

[22] Filed: Feb. 3, 1970

[21] Appl. No.: 8,442

[52] U.S. Cl. ................................260/3, 260/5, 260/23.7 M, 260/38, 260/53 R, 260/845, 260/846
[51] Int. Cl. .........................................C08c 9/04, C08c 9/16
[58] Field of Search ................................260/3, 5, 845, 846

[56] References Cited

UNITED STATES PATENTS

| | | | |
|---|---|---|---|
| 3,474,065 | 10/1969 | Gburek et al. | 260/846 |
| 3,294,866 | 12/1966 | Soldatos | 260/845 |
| 2,481,879 | 9/1949 | Ross | 260/845 |
| 2,566,851 | 9/1951 | Novotny et al. | 260/845 |
| 3,437,610 | 4/1969 | Moult | 260/846 |
| 2,476,824 | 7/1949 | Albert | 260/846 |

Primary Examiner—John C. Bleutge
Attorney—Buell, Blenko & Ziesenheim

[57] ABSTRACT

A rubber composition is provided having a high degree of tack in the uncured state and incorporating a para-tertiary-butylphenol-aldehyde novolak resin consisting essentially of recurring groups A and B of the formulae

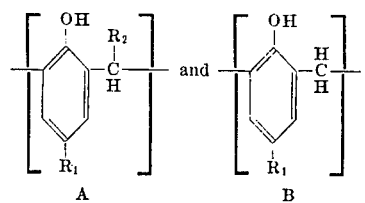

wherein $R_1$ is a alkyl; and $R_2$ is a hydrocarbon radical having 1 to 4 carbon atoms; and wherein the molar ratio of B:A has a value in the range of 0.1 to 0.3.

3 Claims, No Drawings

ALKYLPHENOL-ALDEHYDE RESINS

This invention relates to alkylphenol-aldehyde resins as rubber tackifiers; more particularly to the use of a thermoplastic, non-heat-reactive para-tertiary-butylphenol-aldehyde novolak resin as a rubber tackifier.

Natural rubber has the property that when two fresh surfaces (unvulcanized) are pressed together, they stick; i.e., the rubber is said to have "tack" or "building tack." This property is important in some manufacturing operations, for example, tire building, where different parts are brought into contact before the whole is vulcanized. Most synthetic rubbers do not have enough tack and the addition of a "tackifier" to the rubber compound is often necessary or desirable.

It has been known to impart improved tack to rubbers by incorporating tackifiers such as rosin, polyterpene, and certain types of hydrocarbon resins. It is also known that certain phenolic novolak resins can be used. In many cases, however, the degree of tack which these materials impart to rubbers is low and therefore large amounts must be used, thereby affecting certain of the desirable properties of the rubber.

We have found that an unanticipated high degree of tack can be obtained in uncured rubber compositions, particularly blends of natural rubber and styrene-butadiene copolymers (SBR), by adding a para-tertiary-butylphenol-aldehyde novolak resin consisting essentially of recurring groups A and B of the formulae

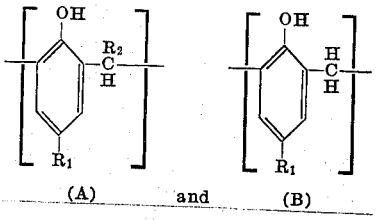

(A) and (B)

wherein
$R_1$ is alkyl; and
$R_2$ is a hydrocarbon radical having one to four carbon atoms; and wherein the molar ratio of B:A has a value in the range of 0.1 to 0.3.

We provide a rubber stock consisting essentially of a mixture of natural rubber and styrene-butadiene copolymers and as a tackifier therefor a polymeric composition of the above formula. We preferably provide that the ratio of B:A in said polymer is about 0.2.

The term "natural rubber" as used herein is intended to include all commercially available grades such as smoked sheet, pale crepe and the like. While we have specified a rubber stock consisting essentially of natural rubber and a synthetic rubber (i.e., styrene-butadiene copolymers) it is believed that other synthetic rubbers such as butadiene-acrylonitrile copolymers, polybutadiene, polyisoprene, polychloroprene, isobutylene homopolymers and copolymers, ethylene-propylene copolymers and certain halogenated olefin polymers may be combined with natural rubber to form a rubber stock which will be tackified to an equally high degree by the present invention.

We further provide a process for imparting building tack to a rubber stock consisting essentially of natural rubber and styrene-butadiene copolymers by mixing with said rubber stock a polymeric composition of the formula specified above.

Other details, objects and advantages of the invention will become apparent from the following description and examples.

PREPARATION OF THE RESIN

It is well known that phenols react with aldehydes to give condensation products if there are free positions on the benzene ring ortho or para to the hydroxyl group. Formaldehyde is by far the most reactive aldehyde and is used almost exclusively in commercial production. The reaction is always catalyzed, either by acids or by bases.

According to the most common method of producing phenolic resins, all of the necessary reactants for the final polymer (phenol, formaldehyde and catalyst) are charged into a resin kettle and reacted together. The reaction proceeds in two stages: First, methylol derivatives are formed by a reaction taking place at the ortho or para position of the benzene ring. These products may be considered the monomers for subsequent reaction. In the presence of acid catalysts, and with the mole ratio of formaldehyde to phenol less than 1, the methylol derivatives condense with phenol to form, first dihydroxydiphenyl methane and on further condensation and methylene bridge formation, fusible and soluble linear low polymers called novolaks.

We have found that by reacting para-tertiary butylphenol with an aldehyde in the presence of an acid catalyst at elevated temperatures, a novolak is obtained having a composition corresponding to group A illustrated above. The aldehyde which we prefer is paraldehyde (acetaldehyde) which results in the $R_2$ radical of group A having the composition $CH_3$. Other aldehydes may be used in the reaction including propionaldehyde, butyraldehyde, isobutyraldehyde and crotonaldehyde and these produce a variation in the hydrocarbon radical ($R_2$) attached to the aldehydic carbon link in group A as follows:

| aldehyde | $R_2$ |
|---|---|
| propionaldehyde | $CH_3CH_2-$ |
| butyraldehyde | $CH_3(CH_2)_2-$ |
| isobutyraldehyde | $(CH_3)_2CH-$ |
| crotonaldehyde | $CH_3CH = CH-$ |

It is believed that other aldehydes and certain ketones may also produce favorable results in the reaction.

To produce the new composition herein, paraformaldehyde is added to the product of the reaction just described. The addition takes place after the aldehyde has reacted as evidenced by water evolution. Paraformaldehyde (the polymeric form of formaldehyde) is of the formula $HO-(CH_2O)_xH$, where x has an average value of about 30. The paraformaldehyde addition results in the production of the group B illustrated in the above formula. Thus, the final resinous composition of our invention is a mixed polymer of recurring groups A and B in which the sequence of the respective groups is random.

The amount of the paraformaldehyde added must be carefully controlled within a relatively narrow range in order to produce the unanticipated high degree of tack in rubber stock of the present invention. To produce a mixed polymer of groups A and B having a molar ratio of B:A in the range of 0.1 to 0.3, a molar ratio between the paraformaldehyde added and the original charge of para-tertiary-butylphenol is observed. This ratio is calculated using moles of paraformaldehyde computed on the basis of the molecular weight of formaldehyde. As will be seen from the results of tack tests which follow, a resin made with 0.2 mole paraformaldehyde per mole of phenol yielded the best tackifying properties. An increase or a decrease in the value of the B:A molar ratio produced lower tack values.

The following examples illustrate various aspects of the invention but are not intended to limit the invention. Unless otherwise noted, temperatures are given in degrees centigrade and all parts and percentages are by weight.

EXAMPLE I

Preparation of para-tertiary-butylphenol-aldehyde novolak resin No. 1

The equipment used for preparing this and the succeeding resins was a conventional laboratory three-necked round-bottomed flask with a separate inlet for a thermometer. One neck was used for a stirring device; another neck was used for a graduated addition funnel; the other neck was used for a Dean-Stark trap for water removal, mounted atop which was a water-cooled condenser. This condenser, through which was circulated tap water at ambient temperature, was connected at the top by means of a tube to the top of a second condenser which was cooled with ice-cold (near 0° C) water. The purpose of this second vertical condenser was to condense acetaldehyde vapors issuing from break-down of the paraldehyde in the reaction flask. The condensed acetaldehyde was collected in a glass receiver connected to the bottom of the second condenser by a ground glass joint. The receiver was immersed in ice water.

Para-tertiary-butylphenol-aldehyde novolak resin was prepared by adding 0.5 grams of para-toluenesulfonic acid and 5.0 grams of oxalic acid to 150 grams (1 mole) of molten para-tertiary-butylphenol in a stirred flask. When the pot temperature was in the range 160° to 180° C, the dropwise addition of 50.0 grams (1.13 moles as acetaldehyde) paraldehyde was commenced. The addition required one hour and 10 minutes, and the reaction temperature was 180° to 185°C. During this time 6 gms. of acetaldehyde was collected in the cold receiver, and 18 gms. (1.0 mole) of water was collected in the Dean-Stark trap. The evolution of 1.0 mole of water was an indication that paraldehyde and para-tertiary-butylphenol had reacted in a 1:1 molar ratio.

Ten minutes after completion of the paraldehyde addition, 0.75 g. of a 30 percent solution of potassium hydroxide in water was added to neutralize the para-toluenesulfonic acid catalyst. A partial bleaching of the dark color of the reaction mass was simultaneously observed. The temperature was then raised to about 200° C and 20.0 grams of 91 percent assay paraformaldehyde (0.6 moles as formaldehyde) added all at once. The reaction mass was maintained at temperatures of 215° to 220° C for 2 hours. Good mechanical agitation was provided throughout the entire reaction. Finally the temperature was raised to 250° C and a vacuum of 50 to 100 mm. Hg was applied to remove any volatile material from the mass. After 5 minutes, the vacuum was released. The molten resin was poured and allowed to cool. The resin amounted to 177.0 g. and had a softening point (Ring-and-Ball method) of 160° C.

This resin (No. 1) was recovered and was evaluated as a tackifier in admixture with a rubber stock as shown in a following section.

The use of para-toluenesulfonic acid catalyst yields considerably faster reaction rates than the reaction rates obtained by the catalyst most often used by prior workers in the art, hydrochloric acid. Also, the addition of potassium hydroxide prior to the second aldehyde reaction is advantageous because (1) it causes an appreciate lightening in color of the reaction mass and (2) it neutralizes the para-toluenesulfonic acid, leaving the greater part of the oxalic acid to catalyze the paraformaldehyde reaction. If the para-toluenesulfonic acid is left unneutralized, not only would the color of the mass after the first aldehyde reaction be dark, but also the color bodies would continue to form, thereby producing a dark end product. Dark color in the resin is to be avoided because it migrates in rubber and can cause staining of the white sidewall strip in tires.

EXAMPLE II

Preparation of para-tertiary-butylphenol-aldehyde novolak resin No. 2

In a manner similar to that described in Example I above, a para-tertiary-butylphenol aldehyde-novolak resin was prepared utilizing the following ingredients in the amounts indicated:

| | Grams |
|---|---|
| Para-tertiary-butylphenol (1.0 mole) | 150 |
| Para-toluenesulfonic acid | 0.5 |
| Oxalic acid | 5.0 |
| Paraldehyde (1.6 moles as acetaldehyde) | 70.0 |
| Aqueous potassium hydroxide (30% solids) | 0.75 |
| Paraformaldehyde (91% assay) (0.4 mole as formaldehyde) | 13.0 |

In this reaction procedure, more paraldehyde but less paraformaldehyde was used, as compared to Example I. Approximately 19 ml. of water was evolved during the paraldehyde reaction, showing that paraldehyde and para-tertiary butylphenol had reacted in approximately a 1:1 molar ratio. This amount is exclusive of the amount of water formed by the subsequent reaction with paraformaldehyde. The object was to obtain resins with softening points as similar as possible, and thereby to eliminate an important source of variability in the tack testing reported below. The yield of this resin (No. 2) was 173.0 g. and the softening point 161° C. The resin was evaluated as a tackifier in admixture with a rubber stock as shown in a following section hereof.

EXAMPLE III

Preparation of para-tertiary-butylphenol-aldehyde novolak resin No. 3

Again in a manner similar to that described in Examples I and II above, a para-tertiary-butylphenol-aldehyde novolak resin was prepared utilizing the following ingredients in the amounts indicated:

| | Grams |
|---|---|
| Para-tertiary-butylphenol (1.0 mole) | 150 |
| Para-toluenesulfonic acid | 0.5 |
| Oxalic acid | 5.0 |
| Paraldehyde (1.77 moles as acetaldehyde) | 78.0 |
| Aqueous potassium hydroxide (30% solids) | 0.75 |
| Paraformaldehyde (91% assay) (0.2 mole as formaldehyde) | 7.0 |

Approximately 19 ml. of water was evolved during the paraldehyde reaction with para-tertiary butylphenol.

The yield of this resin (No. 3) was 173.5 g. and the softening point 159° C. The resin was evaluated as a tackifier in admixture with a rubber stock as shown in a following section.

EXAMPLE IV

Preparation of para-tertiary-butylphenol-aldehyde novolak resin No. 4

Using similar procedures to those followed in Examples I, II and III, a para-tertiary-butylphenol-aldehyde novolak resin was prepared utilizing the following ingredients in the amounts indicated:

| | Grams |
|---|---|
| Para-tertiary-butylphenol (1.0 mole) | 150 |
| Para-toluenesulfonic acid | 0.5 |
| Oxalic acid | 5.0 |
| Paraldehyde | 135.0 |

It will be observed that in this reaction, no paraformaldehyde was used. A relatively larger amount of paraldehyde was used for driving up the softening point. The reaction was carried on for 5 hours. The final softening point of the product was 140° C.

The resin (No. 4) was evaluated as a tackifier in admixture with a rubber stock as shown in the following section.

RUBBER TESTING

Test work was carried out to demonstrate the building tack imparted to rubber by the new para-tertiary-butylphenol-aldehyde resins. The tackifying strength was tested in the following tire carcass formulation:

| | Grams |
|---|---|
| Natural rubber | 40.0 |
| Styrene-butadiene Rubber | 60.0 |
| Fast-extruding furnace black | 45.0 |
| Zinc oxide | 3.0 |
| Stearic acid | 1.0 |
| Total | 149.0 |

The styrene-butadiene portion of the above formulation was a 23 percent styrene copolymer well known in the art as SBR-1502.

Resins Nos. 1-4 from Examples I—IV were milled into the above rubber-carbon black stock on a hot mill at temperatures sufficient to melt the resin. Sulfur and accelerators were added separately on a cool mill. Four finished rubber stocks were compounded as follows (weights in grams):

| Stock Designation: | a | b | c | d |
|---|---|---|---|---|
| Above formulation | 149.0 | 149.0 | 149.0 | 149.0 |
| Resin Ex. No. 3 | 8.0 | — | — | — |
| Resin Ex. No. 2 | — | 8.0 | — | — |
| Resin Ex. No. 1 | — | — | 8.0 | — |
| Resin Ex. No. 4 | — | — | — | 8.0 |
| Accelerator No. 1 | 0.8 | 0.8 | 0.8 | 0.8 |
| Accelerator No. 2 | 0.2 | 0.2 | 0.2 | 0.2 |
| Sulfur | 2.5 | 2.5 | 2.5 | 2.5 |

In these examples accelerator No. 1 was N-cyclohexyl-2-benzothiazolesulfenamide, and accelerator No. 2 was diphenylguanidine.

The tack tests were run as follows: Portions of the above compounds were pressed onto pieces of square woven cloth using heat and pressure, insufficient to cause vulcanization but sufficient to give the resin-containing rubber a cloth backing. One-inch by eight-inch strips of the coated cloth were laid face-to-face and plied together using 3,000 grams of weight for 45 seconds. Only about half of the surface of the cloth-backed strips was used in rubber-to-rubber contact, the remaining part being protected with a thin Teflon film. The plied-up pairs of strips were separated between the jaws of a tensile testing machine. The "pull" was automatically recorded as a graph on paper. The most constant portion of the graph thus produced was taken as the tack strength which is calculated in pounds per inch of width. The above compounds gave the following tack results:

| Compound | a | b | c | d |
|---|---|---|---|---|
| Tack value, lb. per inch | 7.9 | 6.4 | 6.0 | 5.9 |
| Molar ratios (B:A) | 0.2 | 0.4 | 0.6 | 0 |

The higher figures indicate greater tack. By contrast, a control compound with no resin gave a zero result.

The proportions of the tackifying resin are not limited to that shown in the examples. Tack may be imparted by as little as 2 parts of resin per 100 parts by weight of the given rubber.

We claim

1. A rubber stock consisting essentially of a mixture of natural rubber and styrene-butadiene copolymers and as a tackifier therefor a para-tertiary-butylphenol-aldehyde novolak resin consisting essentially of recurring groups A and B of the formulas

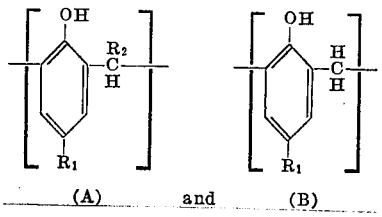

wherein
$R_1$ is alkyl; and
$R_2$ is $CH_3$;
and wherein the molar ratio of B:A has a value in the range of 0.1 to 0.3; and the resin has a final softening temperature in excess of about 140° C.

2. A process for imparting building tack to a rubber stock consisting essentially of natural rubber and styrene-butadiene copolymers by mixing with said rubber stock a para-tertiary-butylphenol-aldehyde novolak resin consisting essentially of recurring groups A and B of the formulas

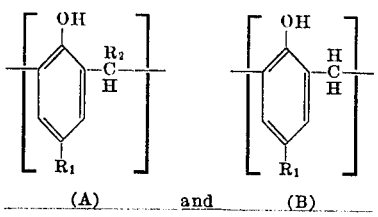

wherein
$R_1$ is alkyl; and
$R_2$ is $CH_3$;
and wherein the molar ratio of B:A has a value in the range of 0.1 to 0.3; and the resin has a final softening temperature in excess of about 140° C.

3. A tacky rubber material consisting essentially of natural rubber stock and styrene-butadiene copolymers produced by mixing with said rubber stock a para-tertiary-butylphenol-aldehyde novolak resin consisting essentially of recurring groups A and B of the formulas

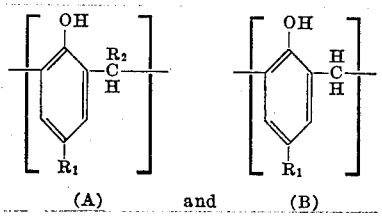

wherein
$R_1$ is alkyl; and
$R_2$ is $CH_3$;
and wherein the molar ratio of B:A has a value in the range of 0.1 to 0.3; and the resin has a final softening temperature in excess of about 140° C.

* * * * *